United States Patent
Cannon et al.

(10) Patent No.: US 11,502,830 B2
(45) Date of Patent: Nov. 15, 2022

(54) ULTRASOUND SPLIT KEY TRANSMISSION FOR ENHANCED SECURITY

(71) Applicant: Kyndryl, Inc., New York, NY (US)

(72) Inventors: Gray Franklin Cannon, Miami, FL (US); Shikhar Kwatra, San Jose, CA (US); Vijay Ekambaram, Chennai (IN); Jennifer L. Szkatulski, Rochester, MI (US); Saravanan Sadacharam, Chennai (IN); Vijay Kumar Ananthapur Bache, Bangalore (IN)

(73) Assignee: Kyndryl, Inc., New York, NY (US)

( * ) Notice: Subject to any disclaimer, the term of this patent is extended or adjusted under 35 U.S.C. 154(b) by 194 days.

(21) Appl. No.: 17/067,857

(22) Filed: Oct. 12, 2020

(65) Prior Publication Data
US 2022/0116203 A1    Apr. 14, 2022

(51) Int. Cl.
*H04L 9/08* (2006.01)
*H04B 11/00* (2006.01)

(52) U.S. Cl.
CPC .............. *H04L 9/085* (2013.01); *H04B 11/00* (2013.01); *H04L 9/0819* (2013.01); *H04L 9/0838* (2013.01)

(58) Field of Classification Search
USPC .......... 380/28, 255, 264, 276; 726/2, 21, 36; 713/150, 163, 181
See application file for complete search history.

(56) References Cited

U.S. PATENT DOCUMENTS

| | | | | |
|---|---|---|---|---|
| 4,881,263 A | * | 11/1989 | Herbison | ............... H04L 9/083 380/43 |
| 5,235,644 A | * | 8/1993 | Gupta | ................. H04L 65/00 713/161 |

(Continued)

FOREIGN PATENT DOCUMENTS

| CN | 102355308 A | 2/2012 |
|---|---|---|
| CN | 106464973 A | 2/2017 |

OTHER PUBLICATIONS

Balfanz, et al., "Talking to Strangers: Authentication in Ad-Hoc Wireless Networks," Xerox Palo Alto Research Center, https://www.researchgate.net/publication/221655428_Talking_To_Strangers_Authentication_in_Ad-Hoc_Wireless_Networks/link/567c120508aebcccAe00eeb4/download, Feb. 2002, pp. 1-13.

(Continued)

*Primary Examiner* — Sharif E Ullah
(74) *Attorney, Agent, or Firm* — John Kennel, Esq.; Kevin P. Radigan, Esq.; Heslin Rothenberg Farley & Mesiti P.C.

(57) ABSTRACT

The exemplary embodiments disclose a system and method, a computer program product, and a computer system for encryption. The exemplary embodiments may include receiving an encryption request from a first smart device, preparing a response to the encryption request and generating a key, encrypting the prepared response with the generated key, sending the encrypted response to the first smart device, splitting the key into two or more pieces, sending the two or more key pieces to a second smart device, sending the two or more key pieces from the second smart device to the first smart device, assembling the two or more key pieces into the key on the first smart device, and decrypting the encrypted response on the first smart device using the assembled key.

15 Claims, 6 Drawing Sheets

(56) References Cited

U.S. PATENT DOCUMENTS

| | | | |
|---|---|---|---|
| 5,857,022 A | 1/1999 | Sudia | |
| 6,718,038 B1* | 4/2004 | Cusmario | H04K 1/00 380/255 |
| 6,898,288 B2* | 5/2005 | Chui | H04K 1/00 380/278 |
| 7,136,484 B1* | 11/2006 | Koh | H04L 9/3066 380/28 |
| 7,386,725 B2* | 6/2008 | Jinmei | H04L 63/20 713/171 |
| 7,765,329 B2* | 7/2010 | Cruciani | H04L 67/1097 370/395.5 |
| 7,879,111 B2* | 2/2011 | Hardacker | H04W 12/04 380/52 |
| 8,498,417 B1* | 7/2013 | Harwood | H04L 67/1097 713/193 |
| 8,850,190 B2* | 9/2014 | Li | H04L 9/0816 726/3 |
| 9,467,283 B2* | 10/2016 | Buckley | H04W 12/041 |
| 9,519,696 B1* | 12/2016 | Roth | G06F 16/258 |
| 9,774,445 B1* | 9/2017 | Gandhasri | H04L 9/0891 |
| 9,882,713 B1* | 1/2018 | Raza | H04L 9/0825 |
| 10,171,994 B2* | 1/2019 | Kim | H04L 9/085 |
| 10,318,754 B2* | 6/2019 | Yavuz | G06F 21/6227 |
| 10,331,895 B1* | 6/2019 | Roth | G06F 21/602 |
| 10,333,696 B2* | 6/2019 | Ahmed | H04L 9/3268 |
| 10,361,859 B2* | 7/2019 | Clark | H04L 9/3213 |
| 10,546,130 B1* | 1/2020 | Chaney | G06F 16/2477 |
| 10,678,938 B2* | 6/2020 | Agerstam | G06F 21/575 |
| 10,756,887 B2* | 8/2020 | Shemer | H04L 9/085 |
| 10,917,230 B2* | 2/2021 | Feng | G06F 21/53 |
| 11,304,446 B1* | 4/2022 | Abernathy | H04R 1/028 |
| 11,362,947 B2* | 6/2022 | Amulothu | H04L 12/4625 |
| 2003/0196115 A1* | 10/2003 | Karp | H04W 12/03 709/227 |
| 2003/0229789 A1* | 12/2003 | Morais | H04L 9/3213 713/181 |
| 2004/0103220 A1* | 5/2004 | Bostick | G06F 3/067 709/208 |
| 2011/0090541 A1* | 4/2011 | Harper | H04L 9/0637 715/705 |
| 2011/0091033 A1* | 4/2011 | Michiels | H04L 9/304 380/28 |
| 2015/0058913 A1* | 2/2015 | Kandasamy | H04L 63/061 726/1 |
| 2017/0264439 A1* | 9/2017 | Muhanna | H04W 12/02 |
| 2017/0337140 A1* | 11/2017 | Ragupathi | G06F 21/78 |
| 2019/0109713 A1* | 4/2019 | Clark | H04L 67/104 |
| 2019/0268335 A1* | 8/2019 | Targali | H04L 9/0643 |
| 2020/0106600 A1 | 4/2020 | Dreifus | |
| 2020/0205067 A1* | 6/2020 | Liu | H04W 16/18 |
| 2020/0233963 A1* | 7/2020 | Hamamoto | G06F 21/57 |
| 2021/0075627 A1* | 3/2021 | Hathorn | H04L 9/0891 |
| 2021/0091943 A1* | 3/2021 | Hathorn | H04L 9/0894 |
| 2021/0091944 A1* | 3/2021 | Hathorn | H04W 12/069 |

OTHER PUBLICATIONS

Di Falco, Andrea, et al., "Perfect Secrecy Cryptography via Mixing of Chaotic Waves in Irreversible Time-Varying Silicon Chips," Nature Communications 10.1 (2019): 1-10.

Dickson, "Wireless Communication Options for a Mobile Ultrasound System," wpi.edu, http://alumni.media.mit.edu/%7Ewiz/ultracom.html, Aug. 2008, pp. 1-252.

Iannacci, Francis, et al., "ChirpCast: Data Transmission via Audio," arXiv.org preprint, arXiv: 1508:07099v1, Aug. 28, 2015, 10 pages.

Karapanos, et al., "Sound-Proof: Usable Two-Factor Authentication Based on Ambient Sound," USENIX, https://www.usenix.org/system/files/conference/usenixsecurity15/sec15-paper-karapanos.pdf, Aug. 12-15, 2015, pp. 1-17.

Kostiainen, Intuitive Security Initiation Using Location Limited Channels, https://www.researchgate.net/publication/249778995_Intuitive_Security_Initiation_Using_Location-Limited_Channels, May 15, 2020, pp. 1-6.

Mahmood, et al., Symmetric Key Cryptography Using Dynamic Key and Linear Congruential Generator (LCG), International Journal of Computer Applications (0975-8887), vol. 50—No. 19, Jul. 2012, https://research.ijcaonline.org/volume50/number19/pxc3880973.pdf, pp. 1-5.

Mell et al., "The NIST Definition of Cloud Computing", National Institute of Standards and Technology, Special Publication 800-145, Sep. 2011, pp. 1-7.

Munson, Using Ambient Sound As A Two-Factor Authentication System, NakedSecurity by Sophos, https://nakedsecurity.sophos.com/2015/08/17/using-ambient-sound-as-a-two-factor-authentication-system/, Aug. 17, 2015, pp. 1-13.

Ozhiganov, "Ultrasound Data Transferring Between Mobile Devices," AZOFT, https://www.azoft.com/blog/nfc-alternative-ultrasound/, Oct. 9, 2016, pp. 1-2.

Wisneski, "Ultrasonic Local Area Communication," mit.edu, http://alumni.media.mit.edu/%7Ewiz/ultracom.html, May 20, 1998, pp. 1-2.

Written Opinion for International Application No. PCT/CN2021/114238, dated Nov. 23, 2021 (4 pages).

* cited by examiner

… (US 11,502,830 B2)

ULTRASOUND SPLIT KEY TRANSMISSION FOR ENHANCED SECURITY

BACKGROUND

The exemplary embodiments relate generally to information security, and more particularly to encryption.

It can be very difficult to safely and efficiently encrypt data. Data is often encrypted with a cryptographic key. Computers often crack or break cryptographic keys by calculating or exhaustively searching all possible keys. It can be very difficult for a person to confidently secure data with a cryptographic key that cannot be cracked or broken by computers calculating or exhaustively searching all possible keys.

SUMMARY

The exemplary embodiments disclose a system and method, a computer program product, and a computer system for encryption. The exemplary embodiments may include receiving an encryption request from a first smart device, preparing a response to the encryption request and generating a key, encrypting the prepared response with the generated key, sending the encrypted response to the first smart device, splitting the key into two or more pieces, sending the two or more key pieces to a second smart device, sending the two or more key pieces from the second smart device to the first smart device, assembling the two or more key pieces into the key on the first smart device, and decrypting the encrypted response on the first smart device using the assembled key.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
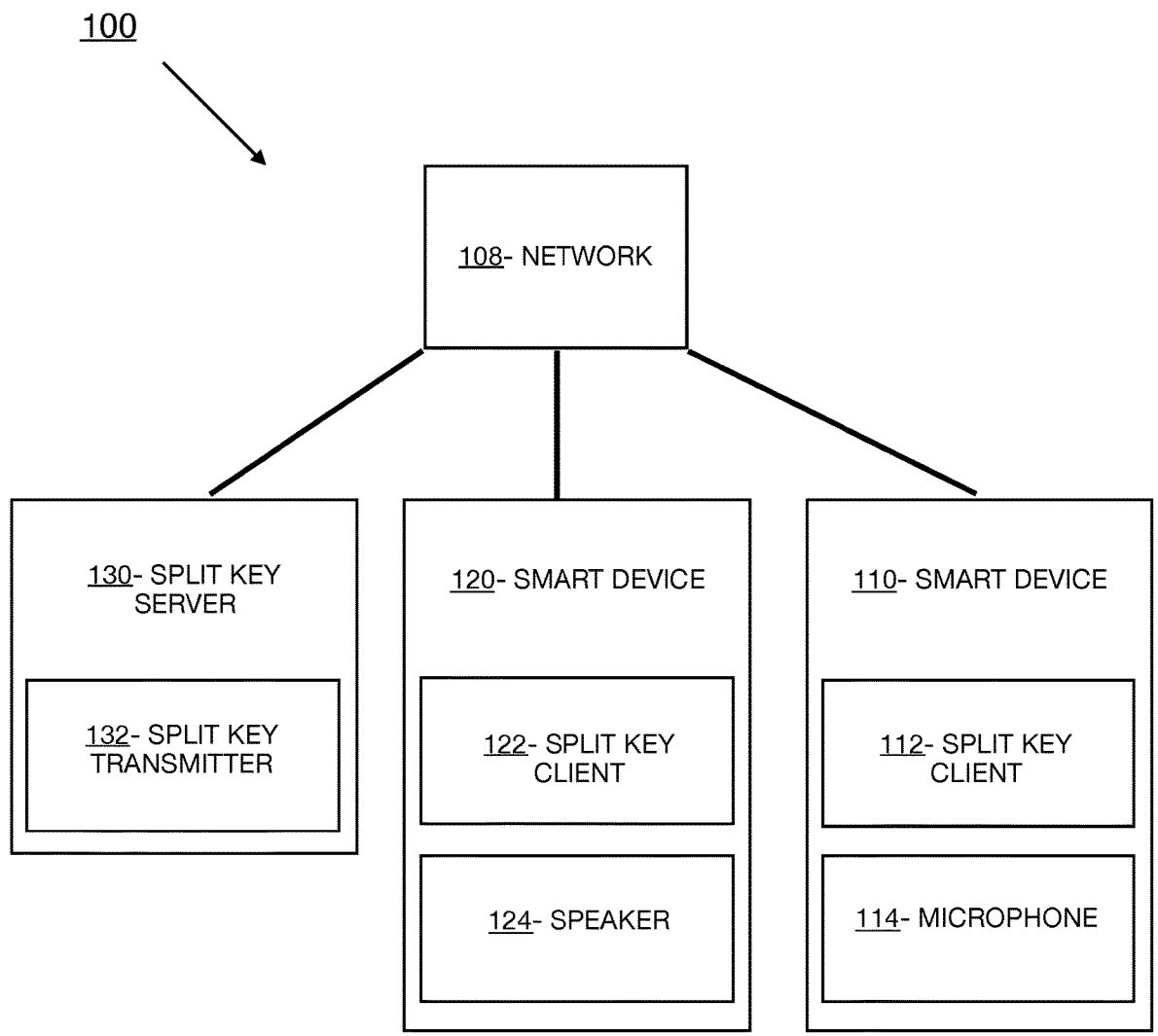
FIG. 1 depicts an exemplary schematic diagram of a split key system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

It can be very difficult to safely and efficiently encrypt data. Data is often encrypted with a cryptographic key. Computers often crack or break cryptographic keys by calculating or exhaustively searching all possible keys. It can be very difficult for a person to confidently secure data with a cryptographic key that cannot be cracked or broken by computers calculating or exhaustively searching all possible keys.

Exemplary embodiments are directed to a method, computer program product, and computer system that will encrypt data. In embodiments, the transmission of data and communication between one or more servers and one or more smart devices may facilitate the encryption of data. In embodiments, encryption of data may refer to any process of converting or manipulating information or data in order to prevent unauthorized access of the information or data. A user may wish to encrypt data for a variety of different purposes or motivations in a variety of different contexts. For example, a business may wish to encrypt a secret formula or composition used to make a product such that competing businesses are unable to create the product. A person may wish to encrypt their personal account passwords such that hackers cannot access their personal accounts. In another example, a person may wish to encrypt commands that facilitate transactions from their bank account to prevent an unauthorized person from depleting money from the person's account. In general, it will be appreciated that embodiments described herein may relate to the encryption of any data within any context and for any motivation.

FIG. 1 depicts the split key system 100, in accordance with the exemplary embodiments. According to the exemplary embodiments, the split key system 100 may include a smart device 110, a smart device 120, and a split key server 130, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the split key system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In some embodiments, the network 108 may facilitate ultrasound communications between connected devices such as the smart device 110, smart device 120, and split key server 130. In general, the network 108 may represent any combination of connections and protocols that will support communications between connected devices.

In the example embodiment, the smart device 110 includes a split key client 112 and microphone 114, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 4, as part of a cloud implementation with reference to FIG. 5, and/or as utilizing functional abstraction layers for processing with reference to FIG. 6.

The split key client 112 may be a software and/or hardware application capable of communicating with and providing a user interface for a user to interact with a server, for example the split key server 130, via the network 108. The split key client 112 may act as a client in a client-server relationship. Moreover, in the example embodiment, the split key client 112 may be capable of transferring data between the smart device 110 and other devices via the network 108 such as the smart device 120 and split key server 130. In embodiments, the split key transmitter 132 utilizes various wired and wireless connection protocols for data transmission and exchange, including Bluetooth, 2.4 gHz and 5 gHz internet, near-field communication, Z-Wave, Zigbee, ultrasound, etc. The split key client 112 is described in greater detail with respect to FIG. 2.

In the example embodiment, the microphone 114 may be one or more microphones or any sensor capable of detecting ultrasound waves or signals. In embodiments, the microphone 114 may be capable of detecting ultrasound frequencies greater than or equal to 20 KHz. The microphone 114 is described in greater detail with respect to FIG. 2.

In the example embodiment, the smart device 120 includes a split key client 122 and speaker 124, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 4, as part of a cloud implementation with reference to FIG. 5, and/or as utilizing functional abstraction layers for processing with reference to FIG. 6.

The split key client 122 may be a software and/or hardware application capable of communicating with and providing a user interface for a user to interact with a server, for example the split key server 130, via the network 108. The split key client 122 may act as a client in a client-server relationship. Moreover, in the example embodiment, the split key client 122 may be capable of transferring data between the smart device 120 and other devices via the network 108 such as the smart device 110 and split key server 130. In embodiments, the split key transmitter 132 utilizes various wired and wireless connection protocols for data transmission and exchange, including Bluetooth, 2.4 gHz and 5 gHz internet, near-field communication, Z-Wave, Zigbee, ultrasound, etc. The split key client 122 is described in greater detail with respect to FIG. 2.

In the example embodiment, the speaker 124 may be one or more speakers or any device capable of emitting ultrasound waves or signals. In embodiments, the speaker 124 may be capable of emitting ultrasound frequencies greater than or equal to 20 KHz. The speaker 124 is described in greater detail with respect to FIG. 2.

In the exemplary embodiments, the split key server 130 includes a split key transmitter 132. The split key server 130 may act as a server in a client-server relationship with the split key client 112 and/or split key client 122, and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the split key server 130 is shown as a single device, in other embodiments, the split key server 130 may be comprised of a cluster or plurality of computing devices, working together or working independently. The split key server 130 is described in greater detail as a hardware implementation with reference to FIG. 4, as part of a cloud implementation with reference to FIG. 5, and/or as utilizing functional abstraction layers for processing with reference to FIG. 6.

The split key transmitter 132 may be a software and/or hardware program capable of receiving a configuration of the split key system 100 and receiving an encryption request from smart device 110. Moreover, the split key transmitter 132 may be further configured for preparing a response to the encryption request and generating an encryption key. The split key transmitter 132 is further capable of encrypting the prepared response with the generated encryption key and sending the encrypted response to smart device 110. Additionally, the split key transmitter 132 may be further configured to split the key into two or more pieces based on the received configuration and send the split key pieces to smart device 120 via two or more push notifications. Moreover, the split key transmitter 132 is capable of sending the split key pieces from smart device 120 to smart device 110 via two or more ultrasound signals so that the smart device 110 can assemble the split key pieces to decrypt the encrypted response. Finally, the split key transmitter 132 may complete a user request and/or notify a user. The split key transmitter 132 is described in greater detail with reference to FIG. 2.

Figure 2:
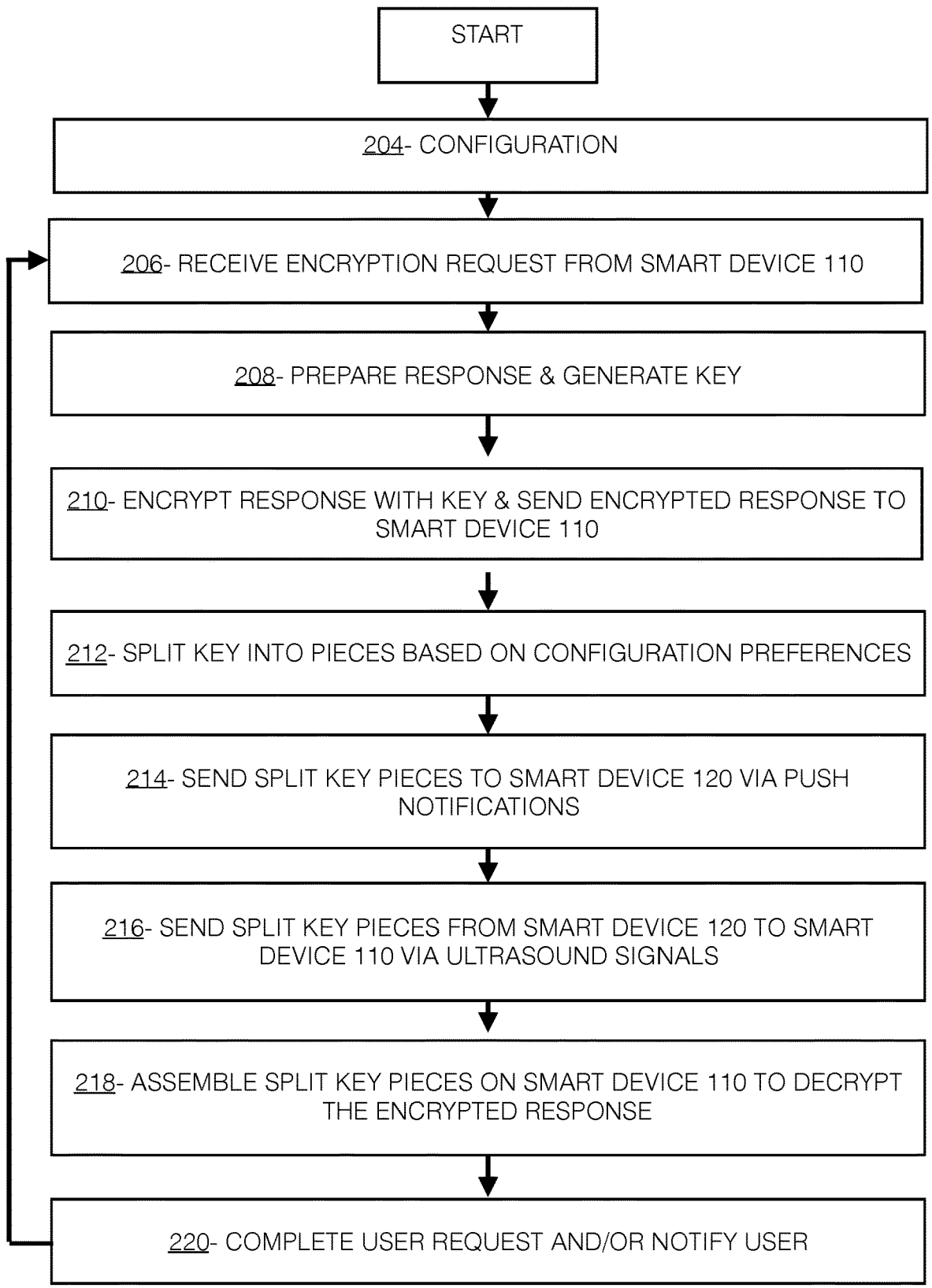
FIG. 2 depicts an exemplary flowchart illustrating the operations of a split key transmitter 132 of the split key system 100 in encrypting data, in accordance with the exemplary embodiments.

FIG. 2 depicts an exemplary flowchart illustrating the operations of a split key transmitter 132 of the split key system 100 in encrypting data, in accordance with the exemplary embodiments.

The split key transmitter 132 may receive a configuration (step 204). The split key transmitter 132 may be configured by receiving information such as a user registration and user preferences. The user registration and user preferences may be uploaded by a user or administrator, i.e., the owner of the smart device 110, the owner of the smart device 120, the administrator of smart device 110, or the administrator of smart device 120. For example, the administrator may be an owner/user of the device, a guardian of a minor who uses the device, an employer of a phone-provided employee, etc. In the example embodiment, the configuration may be received by the split key transmitter 132 via the split key client 112 and/or split key client 122, and the network 108. Receiving the user registration may involve receiving information such as a name, phone number, email address, account credentials (i.e., telephone account, video-chat/web conference, etc.), company name, serial number, smart device 110 and/or smart device 120 type, and the like. In embodiments, the smart device 120 type may specify or dictate a preferred or required push notification service to be used for communication between the split key server 130 and smart device 120. Receiving a user registration may also involve receiving the location of or a link to user databases such as a user's logs, files, data, etc. to be encrypted. For example, the split key transmitter 132 may extract one or more databases of a user's bank account balances as data to be encrypted.

During configuration, the split key transmitter 132 may further receive user preferences (step 204 continued). User preferences may include a number of pieces that the split key transmitter 132 is to split a key into. In embodiments, user preferences may specify different numbers of pieces for different keys used for different purposes. For example, user preferences may specify that encryption requests for any transfer of money require keys to be split into three pieces, while encryption requests for user social media passwords require keys to be split into two pieces. In embodiments, user preferences may specify different numbers of pieces for different keys used for the same purpose, but with different criteria or specification. For example, user preferences may specify that encryption requests for bank transfers of dollar amounts over $5,000 require keys to be split into three pieces, while encryption requests for bank transfers of dollar amounts of $5,000 or less require keys to be split into two pieces. In embodiments, user preferences may additionally specify a sequence or order for sending key pieces to smart device 120. For example, user preferences may specify that push notifications to smart device 120 contain data of pieces of a key that are to be assembled from left to right or alternatively assembled from right to left. In embodiments, user preferences may specify any number of pieces that the split key transmitter 132 is to split keys into for any purposes or motivations.

During configuration, the split key transmitter 132 may additionally receive user preferences including ultrasound frequency profiles. Ultrasound frequency profiles may specify the given ultrasound frequencies that a user or administrator wishes for their smart device 120 to use when communicating with their smart device 110. In embodiments, a user may specify that a first type of key is to be split into three pieces, while a second type of key is to be split into two pieces. The received ultrasound frequency profiles may specify three unique frequencies for communication of the first key, and two unique frequencies for communication of the second key. In embodiments, ultrasound frequency profiles may be specified by a user, administrator, or smart device 120 type. For example, a bank may specify that ultrasound frequencies of 55 MHz, 74 MHz, and 99 MHz are to be used for the communication of key pieces pertaining to data or transactions involving their bank accounts. In another example, the smart device 120 type may only be able to communicate at ultrasound frequencies of 225 MHz and 323 MHz, and may require an ultrasound frequency profile that reflects these frequencies. In embodiments, user preferences may specify any ultrasound frequency profiles that the split key transmitter 132 is to use for communication for any purposes or motivations.

During configuration, the split key transmitter 132 may further receive user preferences pertaining to notifying the user. In embodiments, user preferences may specify that the split key transmitter 132 is to notify the user of the completion of their encryption request. A notification to the user may be in the form of audio, video, text, etc. on the user's smart device 110 and/or smart device 120 and may convey information to the user in any manner.

Figure 3:
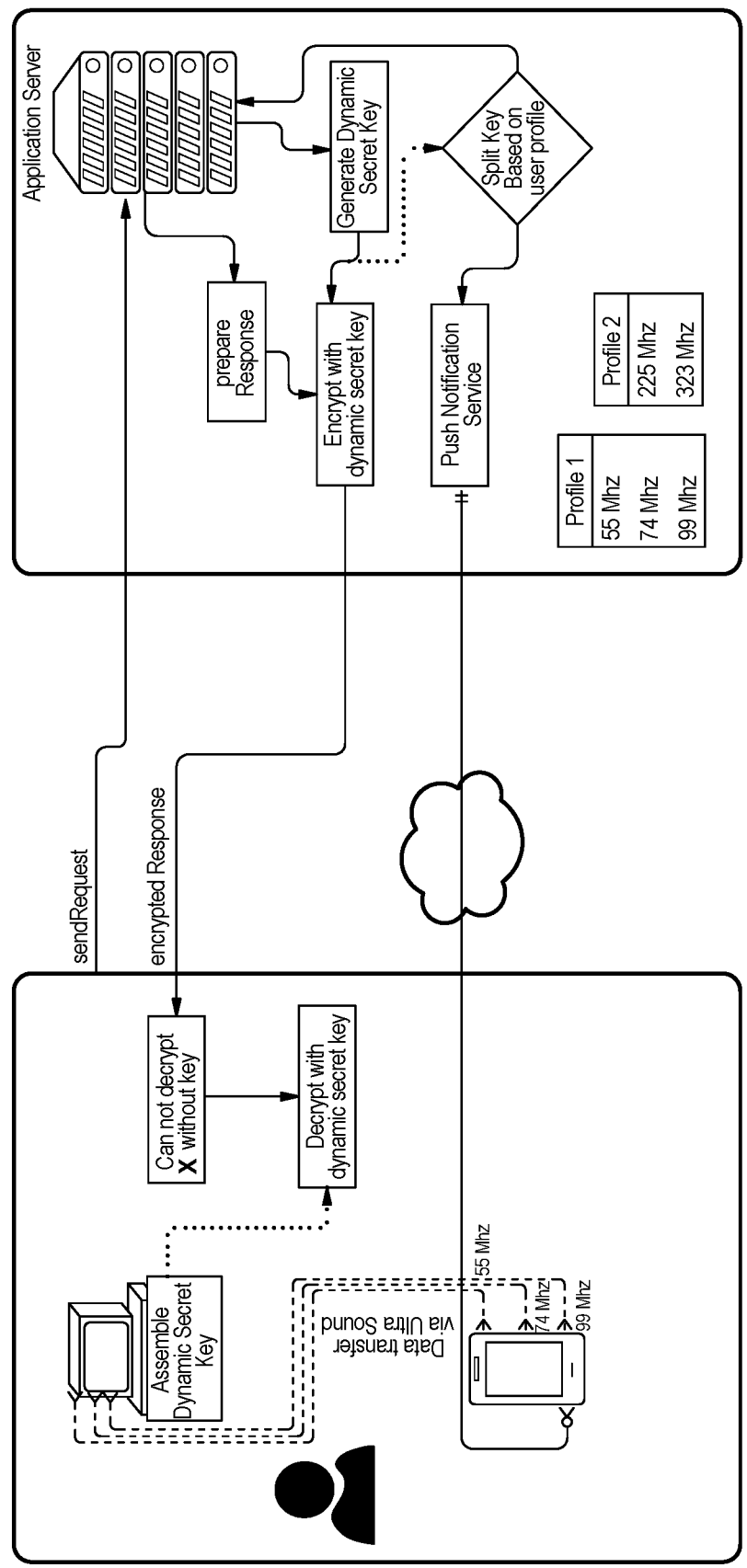
FIG. 3 depicts an exemplary block diagram illustrating the operations of a split key transmitter 132 of the split key system 100 in encrypting data, in accordance with the exemplary embodiments.

To further illustrate the operations of the split key transmitter 132, reference is now made to an illustrative example, and additionally to FIG. 3, where the user uploads a user registration for their smartphone as smart device 120 and computer as smart device 110, along with a link to the user's bank account databases. The user further uploads user preferences requesting that bank transfers over $5,000 require keys to be split into three pieces and bank transfers of $5,000 or less require keys to be split into two pieces. The user further uploads user preference specifying that push notifications to their smartphone are to be communicated in sequence of key pieces to be assembled from left to right. The user also uploads user preferences specifying that the split key transmitter 132 is to notify the user via text notification on the user's smartphone upon completion of their encryption request. The user additionally uploads user preferences specifying ultrasound frequency profiles listed in Table 1.

TABLE 1

| Ultrasound Frequency Profiles | |
|---|---|
| Profile 1: Key Split Into Three Pieces | 55 MHz, 74 MHz, 99 MHz |
| Profile 2: Key Split Into Two Pieces | 225 MHz, 323 MHz |

The split key transmitter 132 may receive an encryption request from smart device 110 (step 206). In embodiments, the split key transmitter 132 may detect an encryption request from smart device 110 via user interactions such as attempting to view, access, transmit, etc. data or information previously received during configuration as sensitive, restricted, or to be encrypted. For example, if a user previously uploaded databases of bank account balances as data to be encrypted during configuration, and the smart device 110 attempts to view the user's bank account balances, the split key transmitter 132 may receive the attempt to view the bank account balance as an encryption request. In embodiments, the split key transmitter 132 may detect a user attempting to view, access, transmit, etc. data to be encrypted via integration and communication of the split key client 112 with the operating system of the smart device 110.

With reference again to the previously introduced example where the split key transmitter 132 receives a configuration, and additionally with reference to FIG. 3, the split key transmitter 132 detects the user attempting to transfer $6,000 from their bank account to a friend's bank account via the user's computer as an encryption request.

Upon receiving an encryption request from smart device 110, the split key transmitter 132 may proceed to prepare a response to the request and generate a key for the encryption request (step 208). The split key transmitter 132 may prepare an appropriate response to the request by preparing one or more commands that would allow the encryption request from smart device 110 to accomplish its intention. For example, if the user sent an encryption request from smart device 110 seeking their bank account balance, the split key transmitter 132 may prepare appropriate response, "Balance: $20,000." In another example, if the user sent an encryption request attempting to transfer $100 from their bank account to another account, the split key transmitter 132 may prepare commands that would facilitate the transfer of $100 from the user's bank account to the other account.

The split key transmitter 132 may additionally generate a key for the encryption request (step 208 continued). In embodiments, the split key transmitter 132 may generate a key in the form of binary data. The generated key may be capable of converting, modifying, manipulating, etc. plain text to cipher text via one or more mathematical operations, transformations, etc. such that the cipher text is not understandable by humans, computers, smart devices, etc. without possession of the key.

With reference again to the previously introduced example where the split key transmitter 132 detects the user attempting to transfer $6,000 from their bank account to a friend's bank account via the user's computer as an encryption request, and additionally with reference to FIG. 3, the split key transmitter 132 prepares commands that would facilitate the transfer of $6,000 from the user's bank account to the friend's bank account. The split key transmitter 132 additionally generates key 001001011.

The split key transmitter 132 may encrypt the prepared response with the generated key, and subsequently send the encrypted response to smart device 110 (step 210). The split key transmitter 132 may encrypt the prepared response by converting, modifying, manipulating the plain text response to cipher text such that the cipher text is not understandable by humans, computers, smart devices, etc. without possession of the key. The split key transmitter 132 may send the encrypted response to smart device 110 without sending the key to smart device 110, such that smart device 110 receives the prepared response in the form of cipher text and is unable to understand the prepared response (at this time).

With reference again to the previously introduced example where the split key transmitter 132 prepares commands that would facilitate the transfer of $6,000 from the user's bank account to the friend's bank account and generates key 001001011, and additionally with reference to FIG. 3, the split key transmitter 132 uses key 001001011 to encrypt the commands capable of facilitating the transfer of $6,000 from the user's bank account to the friend's bank account. The split key transmitter 132 then sends the encrypted response to the user's computer.

Upon sending the encrypted response to smart device 110, the split key transmitter 132 may split the generated key into two or more pieces according to previously received configuration preferences (step 212). In embodiments, the split key transmitter 132 may split the generated key into two halves, two unequal sized pieces, three thirds, three unequal sized pieces, etc.

With reference again to the previously introduced example where the split key transmitter 132 uses key 001001011 to encrypt the commands capable of facilitating the transfer of $6,000 from the user's bank account to the friend's bank account and sends the encrypted response to the user's computer, and additionally with reference to FIG. 3, the split key transmitter 132 splits key 001001011 into three pieces according to the previously received configuration preferences (requests for transfer of greater than $5,000 require three key pieces). The first key piece is 001, the second key piece is 001, and the third key piece is 011 according to the previously received configuration preferences (key piece sequence in order from left to right).

Upon splitting the key into two or more pieces according to the configuration preferences, the split key transmitter 132 sends the two or more split key pieces to smart device 120 via two or more push notifications (step 214). In embodiments, the split key transmitter 132 sends each piece of the key as a separate push notification. In embodiments, the split key transmitter 132 sends each piece of the key sequentially as determined by configuration preferences (i.e., left to right, right to left, etc.).

With reference again to the previously introduced example where the split key transmitter 132 splits key 001001011 into first key piece 001, second key piece 001, and third key piece 011, and additionally with reference to FIG. 3, the split key transmitter 132 sends 001 as a first push notification, then sends 001 as a second push notification, and finally sends 011 as a third push notification all to the user's smartphone.

After the split key transmitter 132 sends the two or more split key pieces to smart device 120 via two or more push notifications, the split key transmitter 132 sends the split key pieces from smart device 120 to smart device 110 via two or more ultrasound signals at two or more frequencies (step 216). In embodiments, the split key transmitter 132 may send the two or more split key pieces to smart device 120 according to one or more ultrasound frequency profiles of the configuration and/or sequentially (left to right, right to left) as specified by configuration preferences. In embodiments, the split key transmitter 132 may utilize one or more speakers 124 to emit the two or more ultrasound signals/frequencies. In embodiments, the split key transmitter 132 may repeat emitting the two or more ultrasound signals/frequencies until the smart device 110 detects and receives the two or more ultrasound signals/frequencies via one or more microphones 114. In embodiments, the smart device 120 and smart device 110 may need to be in close proximity for the split key transmitter 132 to successfully send the split key pieces from smart device 120 to smart device 110 via two or more ultrasound signals at two or more frequencies. For example, if a user is sitting in front of their computer smart device 110 with their smartphone smart device 120 in the same room, the split key transmitter 132 may successfully send the split key pieces from smart device 120 to smart device 110 via two or more ultrasound signals. If a user is sitting in front of their computer smart device 110 with their smartphone smart device 120 in their car a mile away, the split key transmitter 132 may not successfully send the split key pieces from smart device 120 to smart device 110 via two or more ultrasound signals. In embodiments, the split key transmitter 132 may attempt to repeat sending the two or more ultrasound signals at higher amplitudes to increase the chance of successfully sending the split key pieces from smart device 120 to smart device 110. In embodiments, the split key transmitter 132 may send data of the two or more ultrasound signals from smart device 120 to smart device 110 in an alternative manner.

With reference again to the previously introduced example where the split key transmitter 132 sends split key pieces to the smartphone via push notifications, and additionally with reference to FIG. 3, the split key transmitter 132 first sends 001 at 55 MHz, then sends 001 at 74 MHz, and finally sends 011 at 99 MHz from the user's smartphone to the user's computer via speaker 124 according to the configuration preferences.

After the split key transmitter 132 sends the split key pieces from smart device 120 to smart device 110 via two or more ultrasound signals at two or more frequencies, the split key transmitter 132 may assemble the split key pieces on smart device 110 in order to decrypt the previously received encrypted response (step 218). In embodiments, the smart device 110 may detect and receive the two or more ultrasound signals at two or more frequencies via one or more microphone 114 and may receive the two or more ultrasound signals according to specified ultrasound frequency profiles and/or sequence of the configuration preferences. The split key transmitter 132 may assemble the key from the key pieces according to the sequence of the configuration preferences and use the assembled key to decrypt the encrypted response previously received by the smart device 110 in step 210. In embodiments, the split key transmitter 132 may decrypt the encrypted response by converting the response from cipher text to plain text that is understandable by humans, computers, smart devices, etc. In embodiments where a user's request is to view data or information, decrypting the encrypted response results in the user and/or smart device 110 being able to view and understand the requested data or information. In embodiments where a user's request is to perform some action (i.e., transaction, sending of data, etc.), decrypting the encrypted response results in the user and/or smart device 110 being able to view and understand commands that enable the action to take place.

With reference again to the previously introduced example where the split key transmitter 132 first sends 001 at 55 MHz, then sends 001 at 74 MHz, and finally sends 011 at 99 MHz from the user's smartphone to the user's computer via speaker 124 according to the configuration preferences, the split key transmitter 132 assembles the key pieces into the key on the user's computer from left to right according to the configuration preferences. The split key transmitter 132 uses the assembled key to decrypt the commands that would facilitate the transfer of $6,000 from the user's bank account to the friend's bank account.

Upon decrypting the previously received encrypted response, the split key transmitter 132 may complete the user's request and/or notify the user of the completion of their request (step 220). In embodiments, the split key transmitter 132 may complete the user's request by presenting information or data that was sought by the user or smart device 110 and/or performing some action that was desired by the user or smart device 110 (i.e. transaction, sending data, etc.). In embodiments, the split key transmitter 132 may complete the user's request by executing commands that facilitate some action desired by the user. In embodiments, the split key transmitter 132 may notify the user of the completion of their request. A notification to the user may be in the form of audio, video, text, etc. on the user's smart device 110 and/or smart device 120 and may convey information to the user in any manner. In embodiments, the split key transmitter 132 may notify the user according to configuration preferences. In embodiments, the split key transmitter 132 may simply complete the user's request without notifying the user.

With reference again to the previously introduced example where the split key transmitter 132 re-assembles the key on the user's computer and uses the assembled key to decrypt the commands that would facilitate the transfer of $6,000 from the user's bank account to the friend's bank account, the split key transmitter 132 executes the commands to complete a transfer of $6,000 from the user's bank account to the friend's bank account. The split key transmitter 132 additionally notifies the user of the successful bank transfer via text notification on the user's smartphone according to configuration preferences.

In embodiments, the split key transmitter 132 may treat a failure to complete one or more of the above described steps as indicative of a security concern. For example, if push notifications are unable to be sent to smart device 120 because the device is disconnected from network 108, the split key transmitter 132 may cease to operate and/or notify the user and/or administrator of the failure to send push notifications to smart device 120.

FIG. 3 depicts an exemplary block diagram illustrating the operations of a split key transmitter 132 of the split key system 100 in encrypting data, in accordance with the exemplary embodiments.

Figure 4:
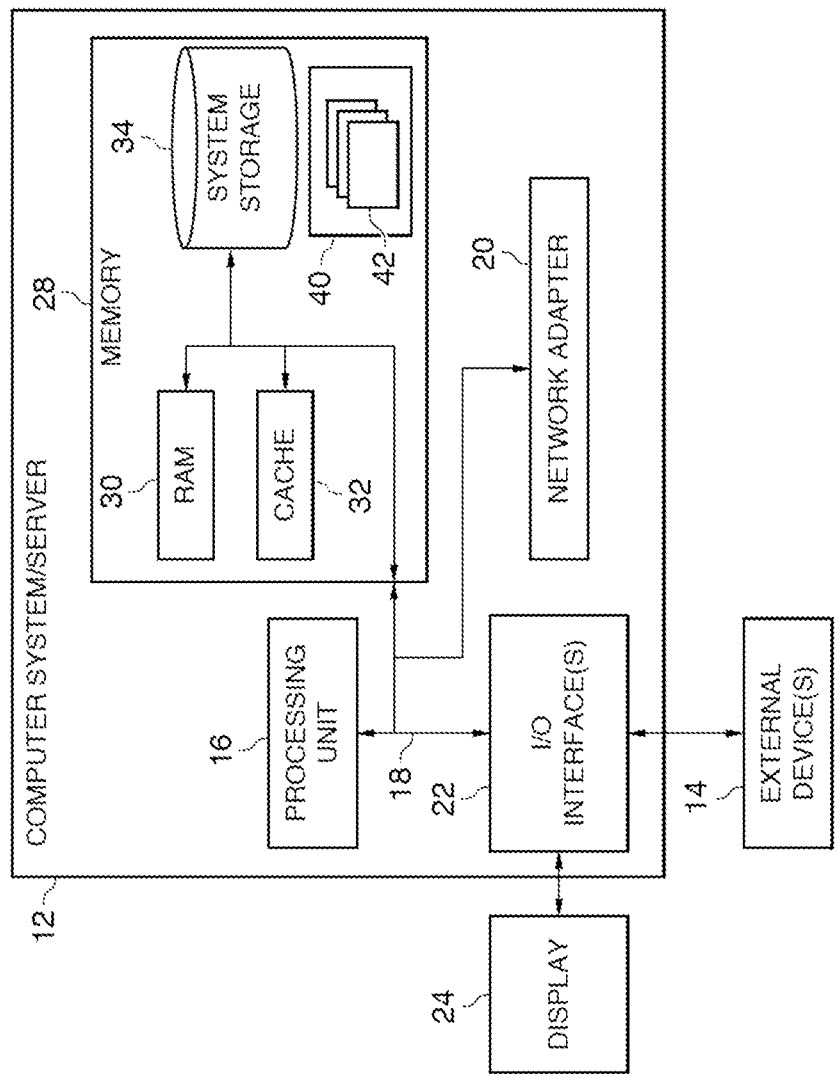
FIG. 4 depicts an exemplary block diagram depicting the hardware components of the split key system 100 of FIG. 1, in accordance with the exemplary embodiments.

FIG. 4 depicts a block diagram of devices within the split key transmitter 132 of the split key system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
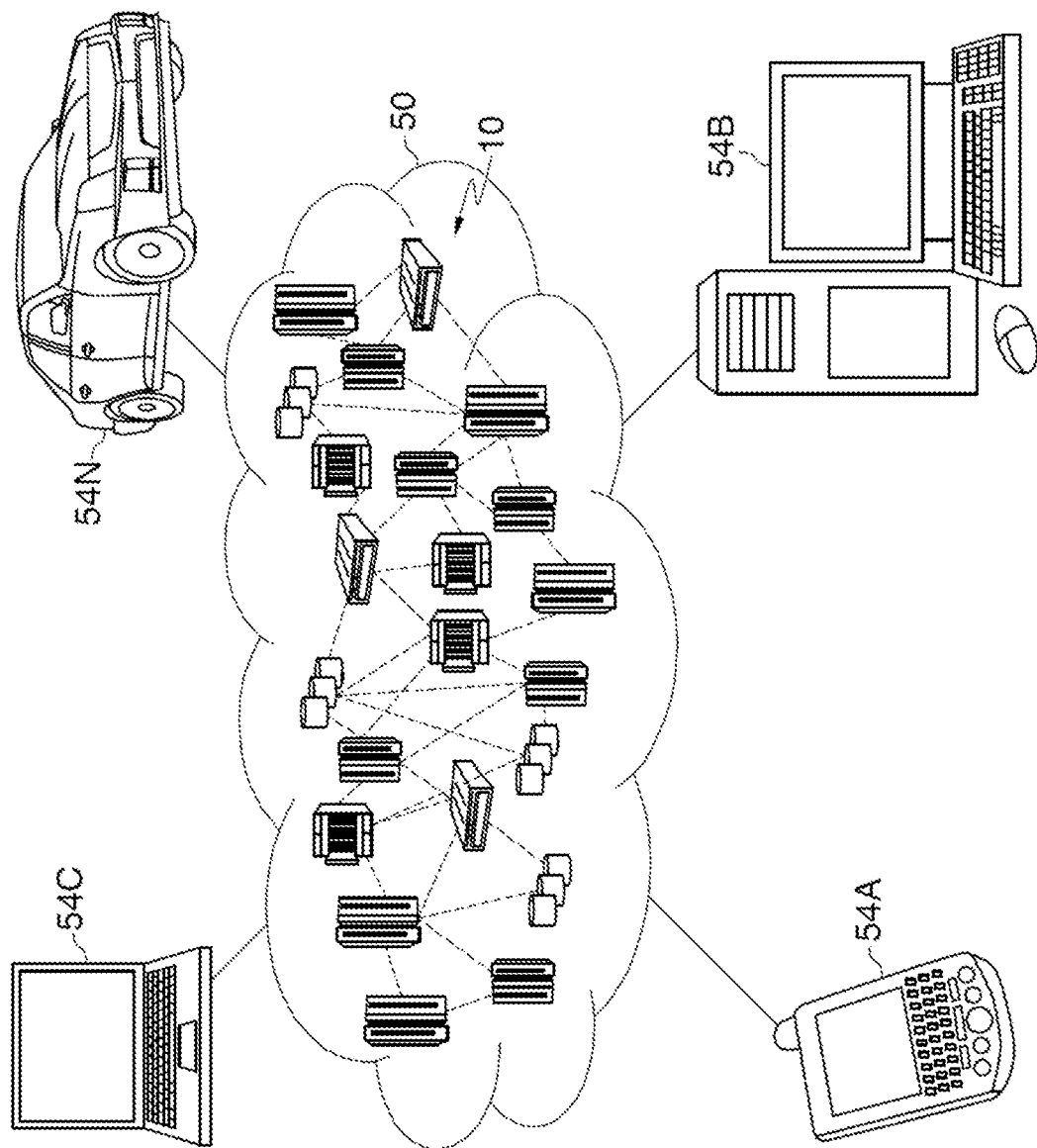
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
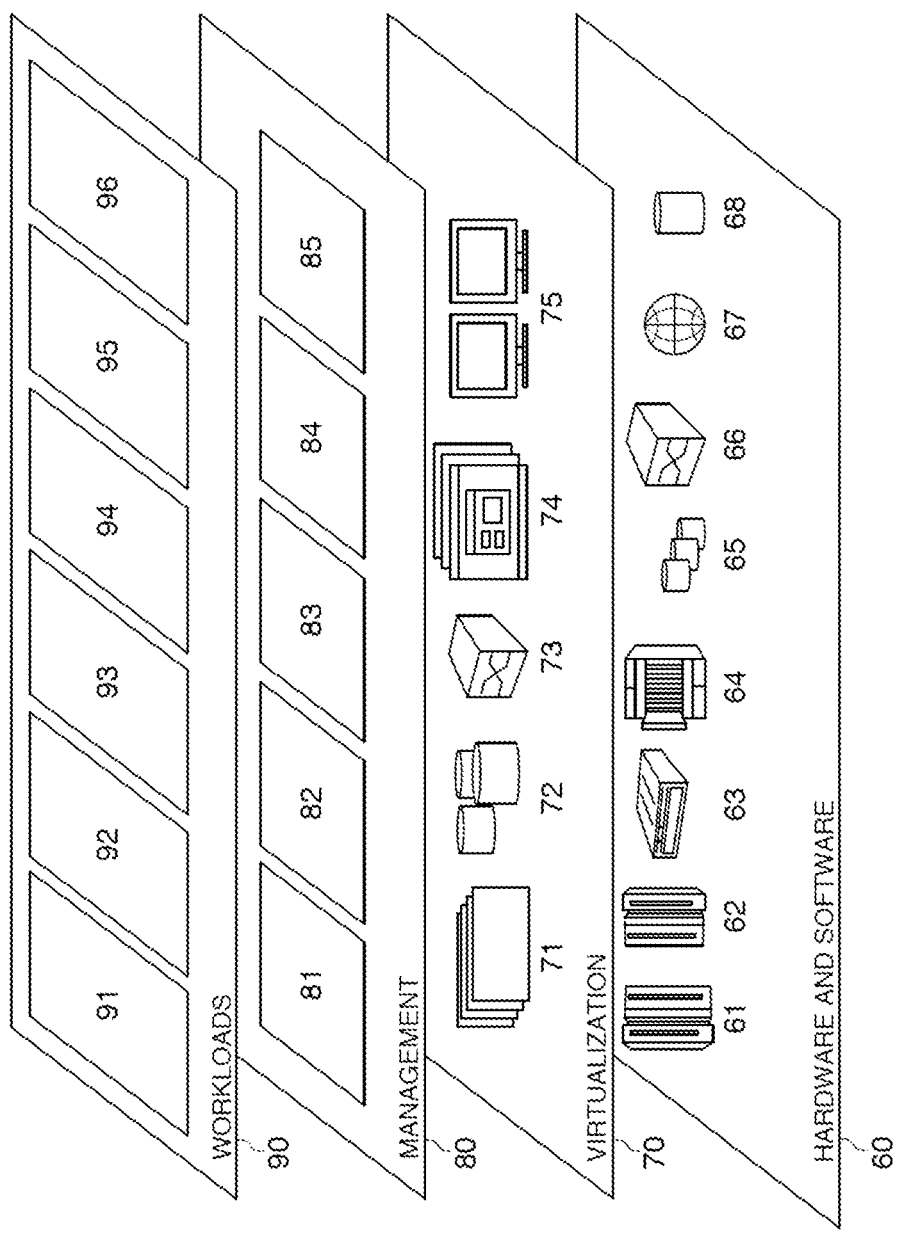
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encryption 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for encryption, the method comprising:
    receiving an encryption request from a first smart device;
    preparing a response to the encryption request and generating a key;
    encrypting the prepared response with the generated key;
    sending the encrypted response to the first smart device;
    splitting the key into two or more key pieces representing the entire key;
    sending the two or more key pieces representing the entire key to a second smart device separate from the first smart device to which the encrypted response is sent;
    initiating sending the two or more key pieces representing the entire key from the second smart device to the first smart device in the form of two or more ultrasound signals to facilitate the first smart device obtaining the key, by assembling the two or more key pieces from the second smart device, for decrypting the encrypted response at the first smart device;
    receiving user key customization data for splitting an encryption key into two or more key pieces, the user key customization data specifying a number of key pieces into which the encryption key is to be split, and multiple different frequencies at which key pieces are to be separately transmitted; and
    wherein splitting the key into two or more key pieces representing the entire key comprises splitting the key into two or more key pieces as specified by the user key customization data, and wherein initiating sending the two or more key pieces from the second smart device to the first smart device comprises initiating sending the two or more key pieces from the second smart device to the first smart device in the form of two or more ultrasound signals as specified in the received user key customization data.

2. The method of claim 1, further comprising:
    executing the encryption request, wherein executing the encryption request comprises displaying data or information or executing one or more commands to complete a transfer of data or information; and
    notifying a user of the executed encryption request.

3. The method of claim 1, wherein:
    the two or more key pieces are sent to the second smart device in the form of two or more push notifications.

4. The method of claim 3, wherein:
    each of the two or more push notifications contain one of the two or more key pieces.

5. The method of claim 1, wherein:
    encrypting the prepared response with the generated key converts plain text to cipher text, and decrypting the encrypted response using the assembled key converts cipher text to plain text.

6. A computer program product for encryption, the computer program product comprising:
    one or more non-transitory computer-readable storage media and program instructions stored on the one or more non-transitory computer-readable storage media capable of performing a method, the method comprising:

receiving an encryption request from a first smart device;

preparing a response to the encryption request and generating a key;

encrypting the prepared response with the generated key;

sending the encrypted response to the first smart device;

splitting the key into two or more key pieces representing the entire key;

sending the two or more key pieces representing the entire key to a second smart device separate from the first smart device to which the encrypted response is sent;

initiating sending the two or more key pieces representing the entire key from the second smart device to the first smart device in the form of two or more ultrasound signals to facilitate the first smart device obtaining the key, by assembling the two or more key pieces from the second smart device, for decrypting the encrypted response at the first smart device;

receiving user key customization data for splitting an encryption key into two or more key pieces, the user key customization data specifying a number of key pieces into which the encryption key is to be split, and multiple different frequencies at which key pieces are to be separately transmitted; and wherein splitting the key into two or more key pieces representing the entire key comprises splitting the key into two or more key pieces as specified by the user key customization data, and wherein initiating sending the two or more key pieces from the second smart device to the first smart device comprises initiating sending the two or more key pieces from the second smart device to the first smart device in the form of two or more ultrasound signals as specified in the received user key customization data.

7. The computer program product of claim 6, further comprising:

executing the encryption request, wherein executing the encryption request comprises displaying data or information or executing one or more commands to complete a transfer of data or information; and notifying a user of the executed encryption request.

8. The computer program product of claim 6, wherein:

the two or more key pieces are sent to the second smart device in the form of two or more push notifications.

9. The computer program product of claim 8, wherein:

each of the two or more push notifications contain one of the two or more key pieces.

10. The computer program product of claim 6, wherein:

encrypting the prepared response with the generated key converts plain text to cipher text, and decrypting the encrypted response using the assembled key converts cipher text to plain text.

11. A computer system for encryption, the computer system comprising:

one or more computer processors, one or more non-transitory computer-readable storage media, and program instructions stored on the one or more of the computer-readable storage media for execution by at least one of the one or more processors capable of performing a method, the method comprising:

receiving an encryption request from a first smart device;

preparing a response to the encryption request and generating a key;

encrypting the prepared response with the generated key;

sending the encrypted response to the first smart device;

splitting the key into two or more key pieces representing the entire key;

sending the two or more key pieces representing the entire key to a second smart device separate from the first smart device to which the encrypted response is sent;

initiating sending the two or more key pieces representing the entire key from the second smart device to the first smart device in the form of two or more ultrasound signals to facilitate the first smart device obtaining the key, by assembling the two or more key pieces from the second smart device, for decrypting the encrypted response at the first smart device;

receiving user key customization data for splitting an encryption key into two or more key pieces, the user key customization data specifying a number of key pieces into which the encryption key is to be split, and multiple different frequencies at which key pieces are to be separately transmitted; and wherein splitting the key into two or more key pieces representing the entire key comprises splitting the key into two or more key pieces as specified by the user key customization data, and wherein initiating sending the two or more key pieces from the second smart device to the first smart device comprises initiating sending the two or more key pieces from the second smart device to the first smart device in the form of two or more ultrasound signals as specified in the received user key customization data.

12. The computer system of claim 11, further comprising:

executing the encryption request, wherein executing the encryption request comprises displaying data or information or executing one or more commands to complete a transfer of data or information; and notifying a user of the executed encryption request.

13. The computer system of claim 11, wherein:

the two or more key pieces are sent to the second smart device in the form of two or more push notifications.

14. The computer system of claim 13, wherein:

each of the two or more push notifications contain one of the two or more key pieces.

15. The computer system of claim 11, wherein:

encrypting the prepared response with the generated key converts plain text to cipher text.

* * * * *